Oct. 15, 1935.  J. B. BRENNAN  2,017,525
HEATER FOR MOTOR VEHICLES
Filed Jan. 2, 1932
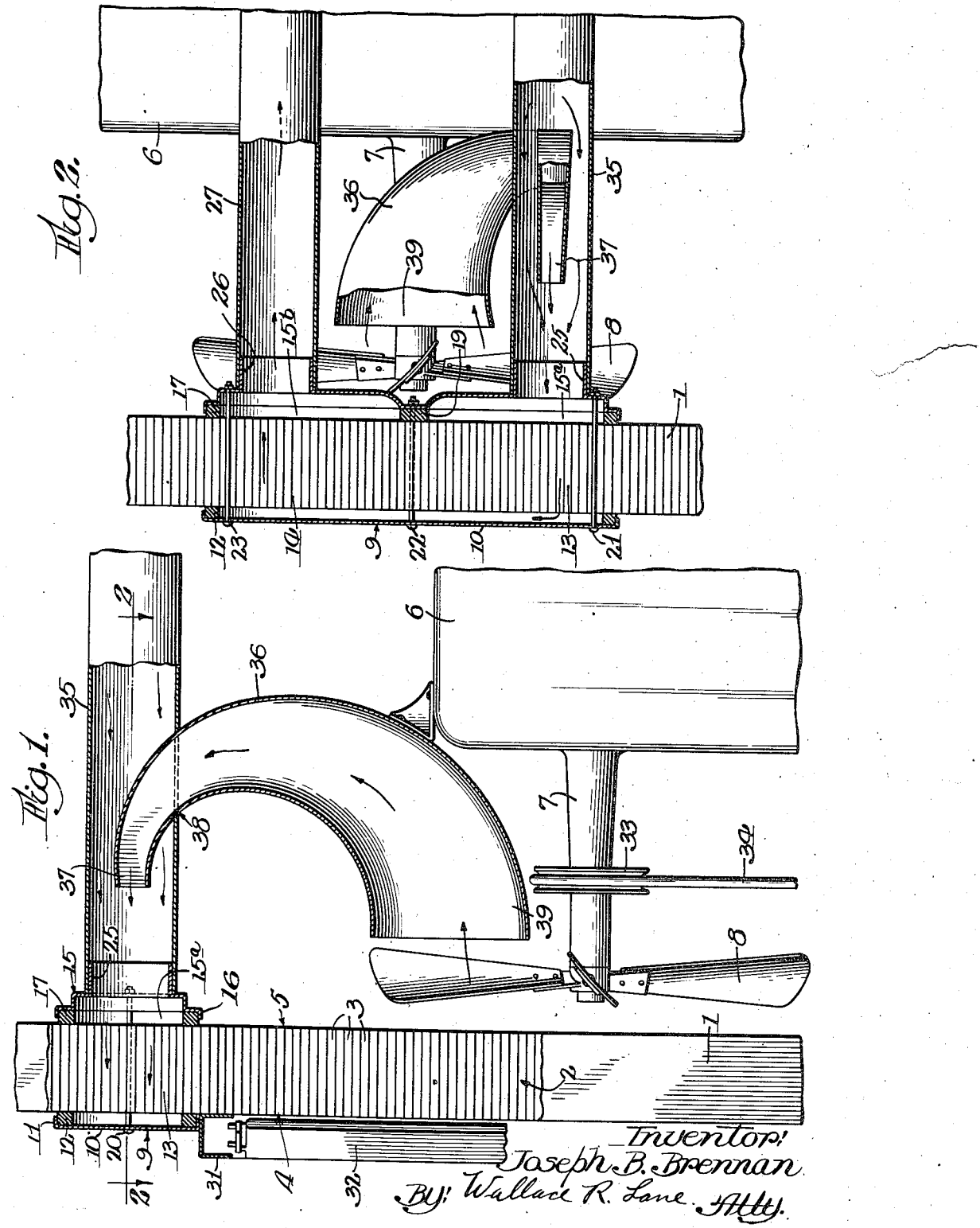
Inventor:
Joseph B. Brennan
By: Wallace R. Lane, Atty.

Patented Oct. 15, 1935

2,017,525

UNITED STATES PATENT OFFICE 2,017,525

HEATER FOR MOTOR VEHICLES

Joseph B. Brennan, Fort Wayne, Ind., assignor to The Magnavox Company, Chicago, Ill., a corporation of Arizona Application January 2, 1932, Serial No. 584,505

5 Claims. (Cl. 257—125)

The present invention relates to the heating of a motor vehicle, and more particularly to the supplying of heated air to the tonneau or occupant compartment of the vehicle and to the obtaining of the heat from the radiator of the vehicle.

Among the objects of the invention, is to conduct air passing normally through the motor vehicle radiator and preferably delivered under pressure from the motor vehicle fan, to and through different parts of the radiator core to absorb heat therefrom, and to supply the air so heated to the tonneau or occupant compartment of the vehicle. In the case of recirculating the air from the tonneau, the air supplied from the fan to the core parts, supplies fresh air to the circulating air as well as effecting a circulation flow with the circulating air. In this way the heat of the water in the cooling radiator may be readily utilized to amply heat the air supplied to the tonneau without necessitating the use of an additional radiator.

Moreover, by passing the air a plurality of times through the radiator core, a successively or serially through different parts of a radiator core, ample heat is obtained. Also, by receiving the air directly from the motor fan, no separate fan is essential, fresh air is continually furnished to the tonneau, and no fumes, gases or vapors from the exhaust or carburetor can pass to the tonneau.

Another object of the invention is to provide novel means for conducting air under pressure, such as the air normally passing through the radiator and preferably delivered from the motor fan, to and through different portions of the radiator core to heat the air, and thence to the tonneau. The air is recirculated from the tonneau, the means for receiving the air from the fan and delivering it to the radiator core parts, acting as an aspirator for the returning air from the tonneau.

The heating device of this invention is, therefore, simple, easily installed, and economical in construction. No added moving part is needed in the car.

Another object of the invention is to provide a novel means of conducting, or conducting and circulating heated air to, or to and from the vehicle tonneau, and successively through different core parts of the radiator, and also conducting air under pressure from the motor fan to the heating parts of the core, with or without aspirating recirculating air.

Other objects, advantages, capabilities, and features are comprehended by the invention as will later appear, and as are inherently possessed thereby.

Referring to the drawing;

Fig. 1 is a view in vertical cross section showing the novel heating device whereby air is recirculated by aspiration; and, Fig. 2 is a horizontal sectional view taken in a plane represented by line 2—2 in Fig. 1.

Referring more in detail to the drawing the embodiment selected to illustrate the invention, is shown associated with a motor vehicle having a radiator 1, the core 2 of which may be of honeycomb or like type, and preferably having a multiplicity of air passages 3 extending from the front 4 to the back 5 thereof. The vehicle may have an internal combustion motor 6 carrying a fan bracket 7 for rotatably supporting a fan 8. The latter operates to draw air through the air passages 3 in the usual way.

The heating means or device of this invention comprises an attachment connected to a portion of the radiator core, and preferably at the upper part thereof where the water in the core is at the highest temperature. At the front of the core 2 and at the upper part of the radiator is located a chambered or pan shaped member 9 having a wall 10 provided with a flange 11 and a perimetric gasket 12 which may be made of any suitable material, such as composition, rubber, leather, wood, cork, fibre or the like, and which is sufficiently yieldable as not to injure the face 4 of the core 2. The member 9 and the gasket 12 thus span across the front of the core portions or parts 13 and 14, and enclose a shallow space or chamber extending across the front of said core portions or parts 13 and 14 whereby air may pass from part 13 by way of the chamber of the member 9 to the part 14.

At the rear of the core portions 13 and 14 and opposite the member 9, is located another chambered or pan shaped member 15 having a perimetric flange 16 engaging with a perimetric gasket 17 of similar material to the gasket 12, this gasket engaging the rear face of the radiator core. Intermediate the member 15 is interposed a partition 19. This partition engages in a vertical line or strip against the face 5 of the radiator and between the core portions 13 and 14 so as to divide the member 15 into chambers 15ª and 15ᵇ as clearly shown in Fig. 2 of the drawing.

For the purpose of holding the chambers 9 and 15 in engagement with the core portions 13 and 14, these members are provided with suitable apertures through which pass securing bolts 20, 21, 22, and 23, these bolts passing through suitable air passages 3 as clearly shown in Figs. 1 and 2 of the drawing.

Chambers 15ª and 15ᵇ include hollow extensions having inlet and outlet sleeves 25 and 26. To the sleeve 26 is connected a duct 27 which leads back and communicates with the tonneau of the vehicle. In this duct may be provided any suitable controlling or regulating valve for controlling or regulating the flow as well as the pressure of air through the delivery duct 27 and into the tonneau.

At the front of the radiator and below the member 9, is preferably located a shutter casing 31 containing a number of shutter elements 32 adapted to be opened and closed by suitable means leading to the tonneau and controlled by the occupant thereof.

The fan may be operated by way of a pulley 33 driven by a belt 34 operatively connected with an operative part of the motor 6.

To the sleeve 25 is connected an air return duct 35 leading from the tonneau to the chamber 15ª for recirculation of air. A receiving and aspirating duct 36 is connected to the duct 35, and has its delivery end or outlet 37 extending into the duct 35 and directed toward the chamber 15ª. This duct 36 extends through a suitable aperture 38 provided in the duct 35, and is curved so that its inlet end 39 is located in proximity to and at the rear of the fan 8. The duct 36 is tapered from its inlet to its outlet so as to increase the velocity of flow of air delivered to it by and received by it from the fan, whereby as the air is projected from the outlet or nozzle 37, there is an aspirating effect to cause a flow of recirculated air through the duct 35 as indicated by the arrows.

In operation the atmospheric air passes through the shutter and the lower portion of the radiator core, to the fan, the latter acting to draw the air through the core in the usual way. A part of the air is then forced into the inlet 39 of the duct 36, under pressure. By reason of the tapering of the duct, the velocity of the air increases as it flows toward the outlet of the duct.

The air projected by the nozzle 37 of the duct 36, enters the chamber 15ª and travels by way of core part 13, chamber of member 9, core part 14, chamber 15ᵇ, and delivery duct 27 to the tonneau. At the same time the stream of air passing from the nozzle 37 will aspirate the air in the duct 35 and draw air from the tonneau through the duct 35 for recirculation. In this case, fresh air is being supplied in the circulating stream of air, while at the same time the aspirating effect acts to cause the circulation and recirculation of the air in the circuit.

While I have herein disclosed and upon the drawing shown an illustrative embodiment of my invention and means of practicing the same, it is to be understood that the invention is not limited thereto, but comprehends other constructions, arrangements of parts, details, features, and process steps without departing from the spirit thereof.

Having thus disclosed the invention, I claim:

1. A heating device for a motor vehicle having a radiator, a fan and a tonneau, comprising ducts communicating with said tonneau and with parts of said radiator for circulation of air therethrough, means establishing communication between said parts of said radiator, and an aspirating duct connected to a communicating duct and having its inlet located to receive air under pressure from said fan.

2. A heating device for a motor vehicle having a radiator, a fan and a tonneau, comprising chambered members engaging a portion of said radiator at opposite faces thereof to enclose said portion of said radiator, one of said members being divided into chambers communicating with different parts of said radiator portion, delivery and return ducts connected to said chambers and to said tonneau for circulation of air, and a tapered duct having its outlet in said return duct and its inlet located to receive air under pressure from said fan to add fresh air to the circulating air and to aspirate the air in said return duct for circulation thereof.

3. A heating device for a motor vehicle having a radiator, a fan and a tonneau, comprising ducts so arranged and constructed as to establish communication between said tonneau and said radiator whereby the air in said tonneau is passed through and heated by said radiator and returned to the tonneau, and means for circulating the air in said ducts and through said radiator and including a member leading from said fan to one of said ducts and adapted to receive air from said fan and force the same under pressure into said duct whereby to aspirate the air therein and cause a circulation of the air through said ducts and radiator to the tonneau of the vehicle.

4. A heating device for a motor vehicle having a radiator, a fan and a tonneau, comprising means for enclosing a portion of said radiator, ducts communicating with said tonneau and the enclosed portion of said radiator whereby to provide a closed circulation of air to and from said tonneau, and a duct communicating with the fan and one of said first mentioned ducts whereby to receive air under pressure from said fan and discharge it in said last mentioned duct.

5. A heating device for a motor vehicle having a radiator, a fan and a tonneau, comprising means for enclosing a portion of said radiator, ducts communicating with said tonneau and the enclosed portion of said radiator whereby to provide a closed circulation of air through said ducts and to and from said tonneau, and an aspirating duct connected to a communicating duct and having its inlet located to receive air under pressure from said fan.

JOSEPH B. BRENNAN.